US012715153B2

(12) United States Patent
Larivée et al.

(10) Patent No.: US 12,715,153 B2
(45) Date of Patent: Aug. 25, 2026

(54) SYSTEMS AND METHODS FOR MANUFACTURING TETHERED CONTAINER CAPS

(71) Applicant: MMC Packaging Equipment Ltd., Laval (CA)

(72) Inventors: Denis Larivée, Laval (CA); Marcel Bélanger, Sainte-Julie (CA)

( * ) Notice: Subject to any disclaimer, the term of this patent is extended or adjusted under 35 U.S.C. 154(b) by 566 days.

(21) Appl. No.: 18/027,151

(22) PCT Filed: Sep. 27, 2021

(86) PCT No.: PCT/US2021/052111
§ 371 (c)(1),
(2) Date: Mar. 20, 2023

(87) PCT Pub. No.: WO2022/093457
PCT Pub. Date: May 5, 2022

(65) Prior Publication Data
US 2024/0025070 A1 Jan. 25, 2024

Related U.S. Application Data

(60) Provisional application No. 63/084,514, filed on Sep. 28, 2020.

(51) Int. Cl.
*B26D 1/00* (2006.01)
*B26D 1/03* (2006.01)
(Continued)

(52) U.S. Cl.
CPC ............. *B26D 1/0006* (2013.01); *B26D 1/03* (2013.01); *B26D 7/06* (2013.01); *B65D 55/16* (2013.01);
(Continued)

(58) Field of Classification Search
CPC ......................... B26F 2210/04; B29C 45/0017
See application file for complete search history.

(56) References Cited

U.S. PATENT DOCUMENTS 10,836,549 B2 * 11/2020 Maguire ............ B65D 41/3428
11,332,290 B2 * 5/2022 Maguire ................ B65D 41/04
(Continued)

FOREIGN PATENT DOCUMENTS

WO 2021/186403 A1 9/2021

OTHER PUBLICATIONS

International Search Report and Written Opinion in related international application PCT/US2022/052111 issued on Jul. 4, 2022.

*Primary Examiner* — Michael W Hotchkiss
(74) *Attorney, Agent, or Firm* — Anglehart et al.

(57) ABSTRACT

Systems and methods are provided for making tethered container caps. In one embodiment, the system includes:
a cap holding assembly (58) having an internal tool (62) configured to be disposed within the container cap and to support a skirt of the container cap;
a blade stack (20) comprising a given set of stacked segments including a transversal blade (36) configured to cut a transversal cut (18) in the skirt of the container cap to provide, in use, a tether (8) connecting an upper skirt portion (12) of the container cap and a retaining ring (6); and
a rotation assembly (60) configured to move the cap holding assembly (58) relative to the blade stack (20), such that the blade stack cuts the container cap to from the retaining ring (6) and tether (8).

12 Claims, 13 Drawing Sheets

(51) Int. Cl.
*B26D 7/06* (2006.01)
*B65D 55/16* (2006.01)

(52) U.S. Cl.
CPC ................ *B26D 2001/0033* (2013.01); *B26D 2001/006* (2013.01)

(56) References Cited

U.S. PATENT DOCUMENTS

| | | | | |
|---|---|---|---|---|
| 12,053,898 | B2 * | 8/2024 | Venturini | B26F 1/18 |
| 12,138,819 | B2 * | 11/2024 | Penazzi | B26F 1/22 |
| 2007/0089587 | A1 * | 4/2007 | Liao | B26F 1/18 83/879 |
| 2017/0066164 | A1 * | 3/2017 | Luzzato | B29C 45/0055 |
| 2017/0362003 | A1 | 12/2017 | Maguire | |
| 2019/0344944 | A1 * | 11/2019 | Maguire | B65D 41/34 |
| 2021/0094736 | A1 * | 4/2021 | Maguire | B29C 45/0053 |
| 2022/0126474 | A1 * | 4/2022 | Brunold | B26D 5/007 |

* cited by examiner

SYSTEMS AND METHODS FOR MANUFACTURING TETHERED CONTAINER CAPS

FIELD OF THE INVENTION

The present disclosure relates to systems and methods for manufacturing tethered container caps.

BACKGROUND

Tethered plastic container caps provide a tether (a connecting portion) between a removable lid portion and a retaining ring that remains affixed to the open neck portion of a container. FIG. 1 illustrates a tethered plastic container cap 2 which may include a lid portion 4 (including a circular, horizontally-disposed and closed planar top wall 10, and a cylindrical skirt 12 extending downwardly from the outer circumference of the top wall 10 to an open bottom end of the cap), a retaining ring 6 forming a lowermost portion of the skirt, and a tether 8 disposed between a pair of horizontally aligned top and bottom slits 16, 14. Tethers may prevent caps from being detached (or separated) from their container and may thereby reduce ecological impact caused by plastic waste. Accordingly, tethered container caps solve a number of problems experienced by non-tethered caps and may provide environmental advantages.

Tethered container caps can only enjoy these advantages if the tethers do not break during the entire lifecycle of the container, including the recycling phase. Traditional tethered caps, such as the cap illustrated in FIG. 1, generally include right angles 17 in their tethers, as shown in FIG. 1. These right angles create stress concentration points; hence the tethers are likely to break. Accordingly, there is a need for tethered caps having tethers that do not have right-angles at the transition point between the parallel, spaced-apart and horizontally aligned top and bottom slits 16, 14.

Examples of tethered container caps with no right-angled slit transition points include those disclosed in US Patent Publication 2019/0344944 to Maguire, US Patent Publication 2019/0185232 to Wang, et al., and PCT Patent Publication WO2019207153 to Dreyer, et al. Maguire discloses a tethered cap comprising two tethers having angled or curved transition points, disposed generally on a same side of the cap. Maguire's cap is sold under the moniker THIS CAP. Wang discloses a tethered cap comprising a single longer tether with an angled transition point. The corners connecting the angled edge to the straight edges of the tether may be slightly rounded. Dreyer discloses a tethered cap comprising triangular or trapezoidal film hinges around a tether, which may mimic angled tether edges.

Manufacturing tethered container caps having tethers with non-right angled transition points such as those discussed above presents a challenge because tethered container caps are generally cut using flat blades. Current tethered caps are typically produced in-mold; a post-molding slitting process is not required as the cut which forms the tether is created in the mold. Dreyer details this approach in which the mold is used to create the perforations, film hinges, and other features necessary to create angled edges into the caps as they are made. This approach requires creating a unique mold for every type of cap to be manufactured, and accordingly may be costly and time-consuming. It may also prevent standard components from being used to manufacture a variety of types of tethered caps, which may in turn make manufacturing tethered bottle caps more complex and expensive. Accordingly, in-mold slits are not preferred by consumers and therefore cap manufacturers and brand owners are looking for a slit-approach to creating tethers.

Any slit creating process is constrained by the size of the slit, the size of the tether, and the size of the cap itself. For example, standardized "PCO 1881" 28 mm plastic beverage closures have been so made so lightweight over the last years that there is limited space to create a functional tether with non right-angled transition points. Therefore, any approaches to creating tethered bottle caps may have to create a tether which fits within the standardized bottle cap geometry.

SUMMARY OF THE INVENTION

Based on the shortcomings of standard tethered caps and methods of manufacturing caps with curved tethers, there a need for improved systems and methods of making such tethered container caps. Such improved systems and methods may make the manufacture of tethered container caps faster, less expensive, more efficient, and repeatable. The present disclosure is directed towards (1) systems and methods for making tethered container caps having tethers with non-right-angled transition points, (2) systems and methods including a transversal cutting blade for making tethered container caps, and (3) methods of making systems for making tethered container caps.

According to one embodiment of the invention, a system is provided for making tethered container caps, the system comprising:

- a cap holding assembly (58) configured to hold a cylindrical container cap (2) comprising a horizontal top lid (10) having a circular perimeter (11), a cylindrical skirt (12) extending vertically downwardly from the circular perimeter of the top lid, and a cylindrical retaining ring (6) disposed at a lower end of the skirt opposite the lid, the cap holding assembly comprising:
- an internal tool (62) configured to be disposed within and hold the cylindrical skirt (12) of the container cap;
- a blade stack (20) comprising connected stacked segments (22, 24) which include:
  - first and second blades (22, 24) each having a horizontal cutting edge (46, 48) configured to cut first and second horizontal slits (16, 14) respectively in the skirt to form a tether (8) of the cap, the tether being disposed between the first and second horizontal slits and connecting the retaining ring (6) to an upper portion of the skirt (12), and each of the first and second blades further including a cavity (44) configured to receive a transversal cutting blade (36),
  - the transversal cutting blade (36) having a transversal cutting edge (40) configured to cut a transversal cut (18) in the container cap adjoining at least one of the horizontal slits (14, 16), the transversal cutting edge (40) being disposed at an acute angle to the horizontal cutting edge (46, 48) forming the adjoining horizontal slit (16, 14),
  - the horizontal cutting edge (46, 48) forming the adjoining horizontal slit (16, 14) having a notch (50) configured to receive the transversal cutting edge (40); and
- a rotation assembly (60) configured to move the cap holding assembly (58) relative to the blade stack (20), such that the first, second and transversal blades (22, 24, 36) of the blade stack cut the container cap to form the first and second horizontal slits (16, 14) and the transversal cut (18) that form the tether (8) and retaining ring (6) of a tethered container cap.

According to one embodiment, the transversal blade (36) includes a back rest (38) for supporting the transversal blade in the blade stack (20).

According to one embodiment, the transversal blade (36) comprises a curved blade.

According to one embodiment, the transversal blade (36) comprises an angled blade.

According to one embodiment, the blade stack (20) further comprises a blade spacer (26) disposed between the first blade (22) and the second blade (24), the blade spacer including a cavity (44) configured to hold the back rest (38).

According to one embodiment, the blade stack (20) comprises an over-blade segment (28) and an under-blade segment (30), configured to sandwich the first blade (22) and the second blade (24).

According to one embodiment, the blade stack (20) is made of a single piece or a combination of sub-pieces.

According to one embodiment, the blade stack (20) is arcuate, and the first, second and transversal blades (22, 24, 36) of the blade stack extend along an outer arcuate surface (32) of the blade stack.

According to one embodiment, the blade stack (20) is arcuate and the first, second and transversal blades (22, 24, 36) of the blade stack extend along an inner arcuate surface of the blade stack.

According to one embodiment, the internal tool (62) comprises one or more internal tool grooves (66, 68) configured to receive the first blade (22) and the second blade (24) of the blade stack.

According to one embodiment, the internal tool (62) is configured to allow the tether (8) to be cut in alignment with one or more additional elements of the tethered container cap.

According to one embodiment, the cap holding assembly (58) is configured to rotate about the blade stack (20).

According to one embodiment, the blade stack (20) is configured to rotate relative to the cap holding assembly (58).

According to another embodiment of the invention, a method of manufacturing a tethered container cap is provided, the method comprising:

- providing a cap holding assembly (58) configured to hold a cylindrical container cap (2), the cap comprising a horizontal top lid (10) having a circular perimeter (11), a cylindrical skirt (12) extending vertically downwardly from the circular perimeter of the top lid, and a cylindrical retaining ring (6) disposed at a lower end of the skirt opposite the lid, the cap holding assembly comprising an internal tool (62), a blade stack (20) and a rotation assembly (60),
- the blade stack (20) comprising connected stacked segments (22, 24) which include:
  - first and second blades (22, 24) each having a horizontal cutting edge (46, 48) configured to cut first and second horizontal slits (16, 14) respectively in the skirt to form a tether (8) of the cap, the tether being disposed between the first and second horizontal slits and connecting the retaining ring (6) to an upper portion of the skirt (12), and each of the first and second blades further including a cavity (44) configured to receive a transversal cutting blade (36),
  - the transversal cutting blade (36) including a transversal cutting edge (40) configured to cut a transversal cut (18) in the container cap adjoining at least one of the horizontal slits (14, 16), the transversal cutting edge (40) being disposed at an acute angle to the horizontal cutting edge (46, 48) forming the adjoining horizontal slit (16, 14),
  - the horizontal cutting edge (46, 48) forming the adjoining horizontal slit (16, 14) having a notch (50) configured to receive the transversal cutting edge (40); and
- the rotation assembly (60) being configured to rotate the cap holding assembly (58) relative to the blade stack (20), the method comprising steps of:

- disposing the internal tool (62) within the cylindrical skirt (12) of the container cap to hold the cap within the blade stack;
- rotating, via the rotation assembly, the cap holding assembly relative to the blade stack such that the first, second and transversal blades (22, 24, 36) of the blade stack cut the container cap to form the first and second horizontal slits (16, 14) and the transversal cut (18) that form the tether (8) and the retaining ring (6) of a tethered container cap.

According to one embodiment, the method comprises cutting the first slit (14) and the second slit (16) simultaneously.

According to one embodiment, the method further comprising heating the cylindrical container cap (2).

According to one embodiment, the method further comprising heating one or all or a combination of the blades (22, 24, 36) of the blade stack (20).

According to one embodiment, wherein cutting at least one transversal cut (18) comprises cutting the cylindrical skirt (12) with the transversal blade (36).

According to another embodiment of the invention, a method of manufacturing a blade stack (20) is provided, the method comprising:

- manufacturing a transversal blade (36), the manufacturing comprising:
  - machining a blade blank to have a hollow blade portion surrounding a central hole; and
  - cutting the blade blank into two or more pieces;
- manufacturing one or more blades (22, 24) configured to accommodate the transversal blade (36) in a blade stack (20); and
- assembling the transversal blade (36), and the one or more blades (22, 24) to from the blade stack (20).

According to one embodiment, the step of manufacturing blades configured to accommodate the transversal blade (36) comprises:

- manufacturing a first blade (22) having at least one cavity (44) configured to accommodate a back rest (38);
- manufacturing a second blade (24) having at least one cavity (44) configured to accommodate a back rest (38); and
- either manufacturing the first blade (22) to have at least one notch (50) configured to accommodate the transversal blade (36) or manufacturing the second blade (24) to have at least one notch (50) configured to accommodate the transversal blade (36).

According to one embodiment, the method further comprising manufacturing a blade spacer (26) configured to fit within the blade stack (20) between the first blade (22) and second blade (24).

According to one embodiment, a blade stack is manufactured according to the previously recited method.

According to one embodiment, cutting the blade blank into two or more pieces comprises cutting the blade blank using wire electrical discharge machining.

According to one embodiment, wherein the hollow blade portion is radially symmetrical.

According to another embodiment of the invention, a system for making tethered container caps is provided, the system comprising:

- a cap holding assembly (58) having an internal tool (62) configured to be disposed within the container cap and to support a skirt of the container cap;
- a blade stack (20) comprising a given set of stacked segments including a transversal cutting blade (36) configured to cut a transversal cut (18) in the container cap to provide, in use, a tether connecting an upper portion of the skirt to a retaining ring (6) of the container cap; and
- a rotation assembly (60) configured to move the cap holding assembly relative to the blade stack, such that the blade stack cuts the container cap to form the tether and retaining ring.

According to one embodiment, the blade stack (20) includes a first blade (22) having a first blade portion configured to cut a bottom slit on the container cap and comprising a first cavity; a second blade (24) having a second blade portion configured to cut a top slit on the container cap and comprising a second cavity; at least one transversal blade (36) configured to cut a transversal cut on the container cap adjoining at least one of the top slit and the bottom slit, the transversal blade (36) comprising a cutting edge and a body, the body comprising at least one flat horizontal surface stabilized above and below by engaging other members within said blade stack, and disposed within a notch (50) formed in one of the first blade portion and the second blade portion, such that the cutting edge aligns with one of the first blade portion and the second blade portion; and a back rest (38) disposed within at least one of the first cavity and the second cavity engages an end of said body to stabilize said transversal blade.

According to another embodiment, a method of manufacturing a tethered container cap is provided utilizing the previously recited system, including steps of: providing a container cap (2) having a skirt (12); cutting, via the first blade (22), a top slit (16) which extends partially around the circumference of the skirt; cutting, via the second blade (24), a bottom slit (14) which extends partially around the circumference of the skirt; and cutting, via the transversal blade (36), at least one transversal cut (18) on the container cap adjoining at least one of the top slit (16) and the bottom slit (14).

According to another embodiment of the invention, a method of manufacturing a blade stack (20) is provided including steps of: machining a blade blank (74) to have a circular radially symmetric blade (80) surrounding a central hole (81) and supported by a back support (76); cutting the blade blank into four pieces (74A, 74B, 74C, 74D); removing the back support (76) of one of the four pieces to form a transversal blade (36); forming a block of metal to a desired size to form a back rest (38); manufacturing one or more blades (22, 24) configured to accommodate the transversal blade (36) and the back rest (38); and assembling the transversal blade (36), the back rest (38), and the one or more blades (22,24) to form a blade stack (20).

Other aspects and embodiments of the present disclosure will be described below. Advantages of the present disclosure will be apparent throughout the description.

DETAILED DESCRIPTION

In general, the present disclosure relates to systems and methods for manufacturing tethered container caps. The tethered container caps may have tethers that do not include right angles. Instead, the tethers may be curved or be formed at a different angle. The present disclosure also relates to methods of manufacturing systems for manufacturing tethered container caps in automated, post-molding processes.

Figure 2A:
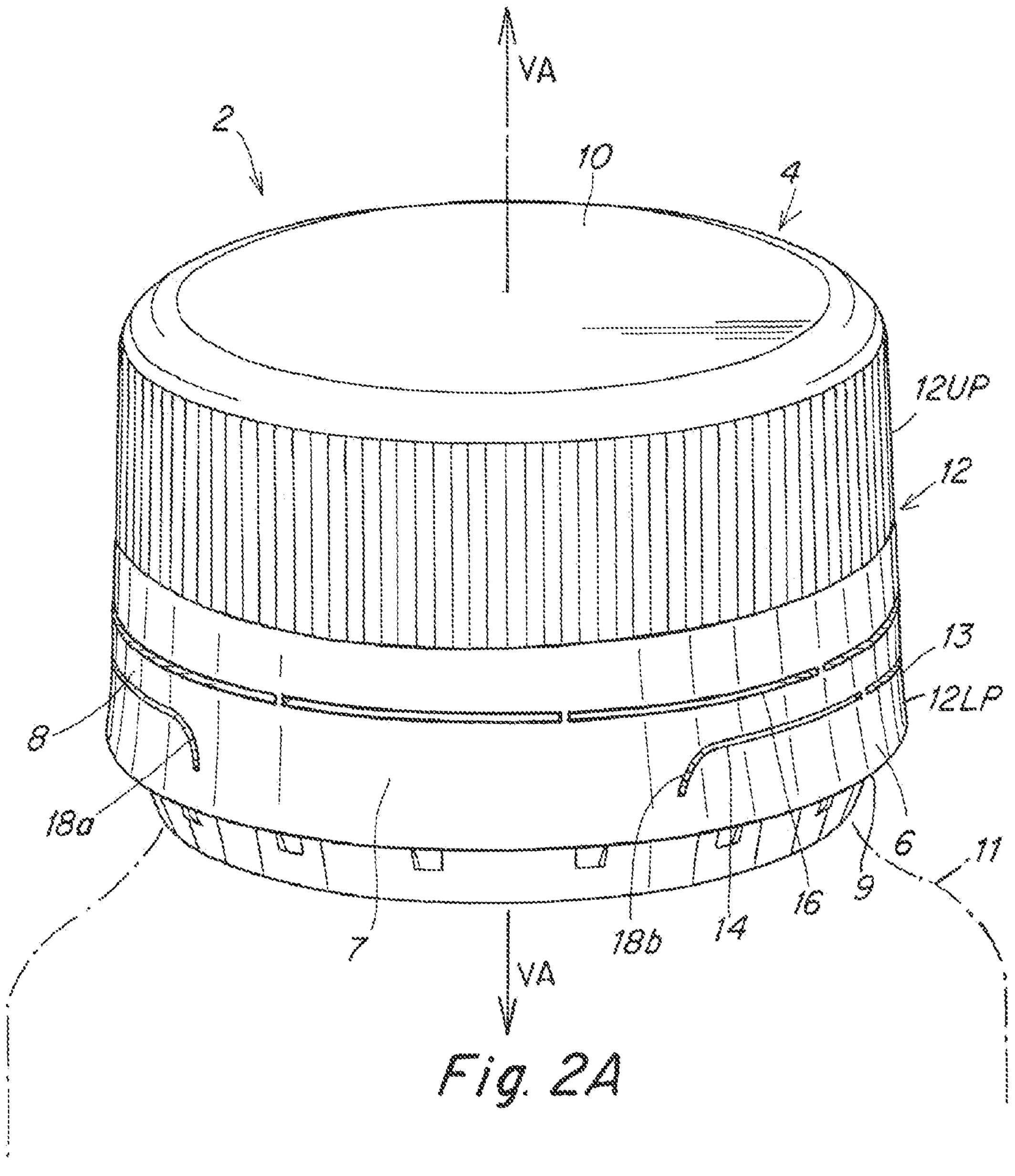
FIGS. 2A-2B are tethered container caps made in accordance with the systems and methods of the present disclosure.
Figure 2B:
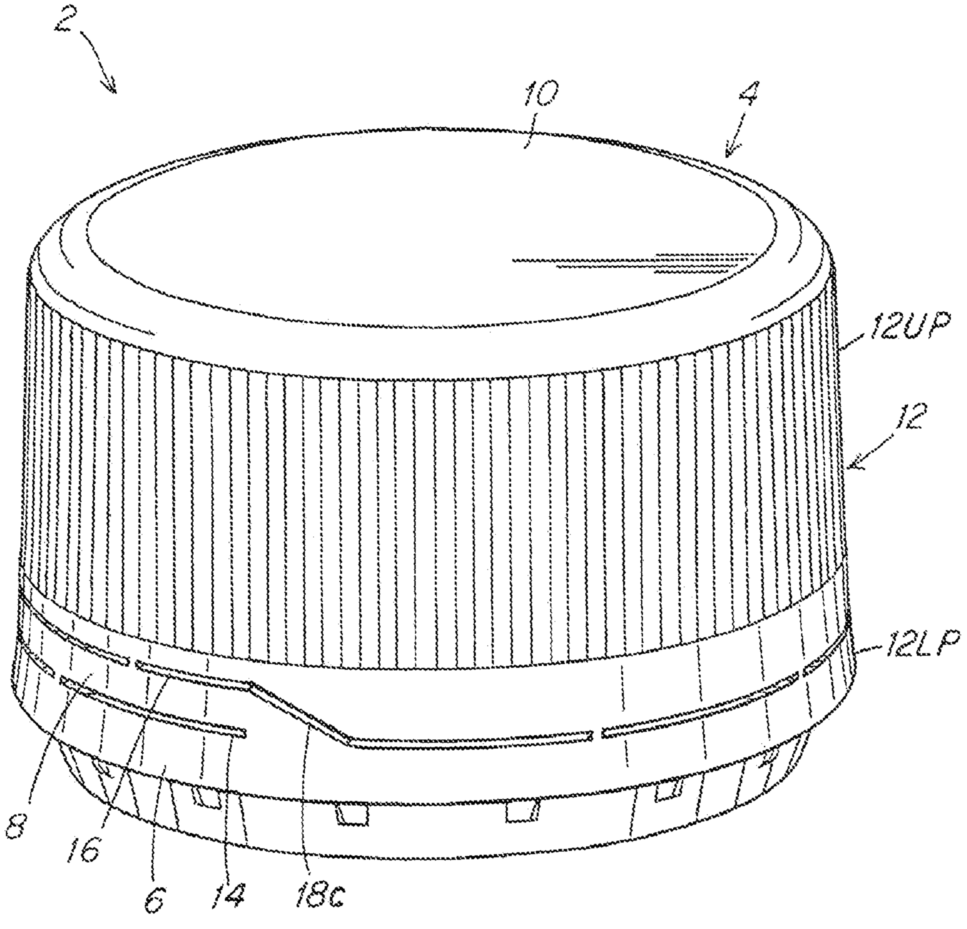

FIGS. 2A-2B illustrate two different exemplary tethered container caps 2 having tethers 8, defined by one or more transverse (non-right-angled) cuts 18, that can be made in accordance with the present disclosure. Each tethered container cap 2 has an upper lid portion (comprising an upper skirt portion 12UP), a lower lid portion (comprising a retaining ring 6), and a tether 8 (defined by the transverse cut(s)) connecting the upper lid portion and the lower lid portion. The upper lid portion includes a horizontally-disposed planar top wall 10 and a cylindrical skirt 12 extending downwardly from the circumference of the top wall 10. Once the tethered container cap 2 is attached to an upper open-ended neck region 13 of a bottle or container 11, the retaining ring 6 remains attached to the container at all times. In contrast, the upper lid portion (including upper skirt portion 12UP) may screw onto and off of the container neck portion, or attach to and detach from the container neck portion by any means known in the art. When the upper lid portion is detached from the container, the tether 8 keeps the upper lid portion from being displaced or lost (as it remains with the container).

Figure 1:
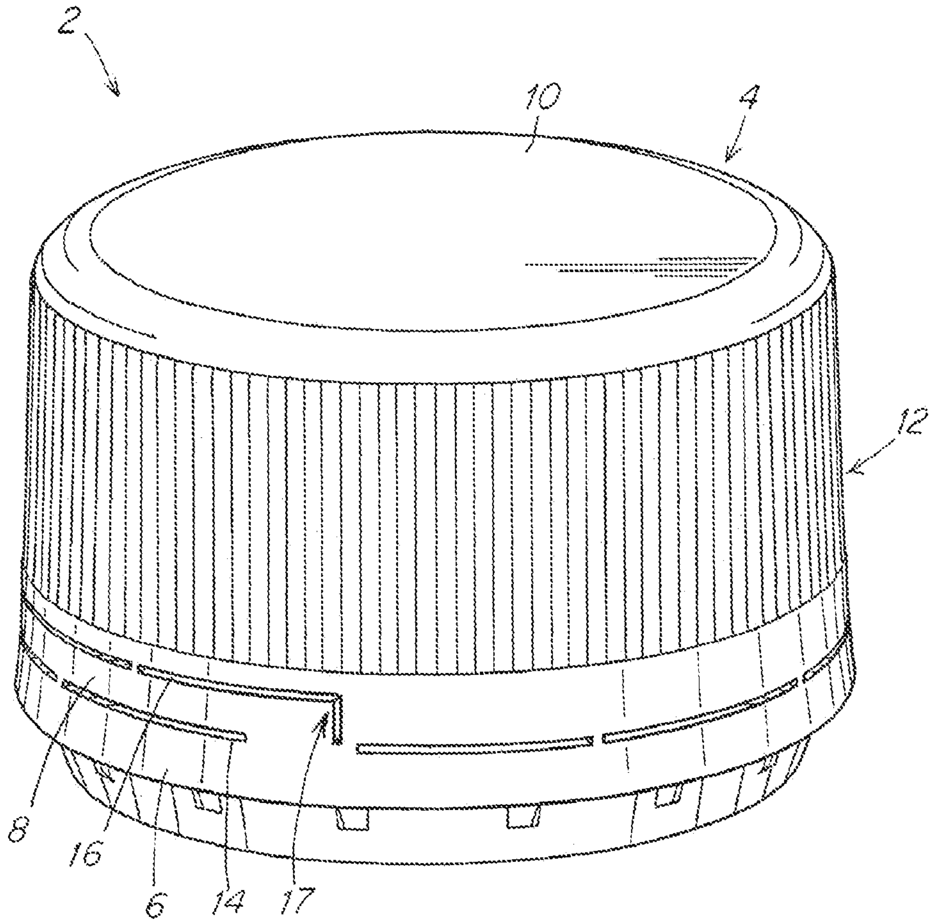
Fig. 1 PRIOR ART
FIG. 1 is a tethered container cap according to the prior art.

The retaining ring 6 and tether 8 of each of the tethered container caps 2 shown in FIGS. 2A-2B are formed via a pair of parallel, spaced-apart horizontally-disposed top and bottom slits 16, 14 (the slits 16, 14 being disposed transverse to the central vertical axis VA of the container and cap), the slits defining a tether 8 (connecting portion) between the slits, and one or more transversal cuts 18 at one or both ends of the tether 8. In FIG. 2A, the tether 8 includes two curved cuts 18*a*, 18*b*, both extending downwardly (directed toward the open bottom end 9 of the cap, and away from the top slit 16), but curved in opposite directions from opposing ends of the bottom slit 14. The bottom slit 14 is discontinuous between the two curved cut edges 18*a*, 18*b*. The curve cuts 18*a* and 18*b* extend the tether 8 of FIG. 2A to a different configuration than the tether of FIG. 1 such that it creates a fulcrum area 7 between the two cuts 18*a*, 18*b*. Namely, the fulcrum 7 primarily extends vertically, such that the lid portion 4 may be tipped back from the container to which it is attached via the retaining ring 6. In an alternative but vertically symmetrical embodiment, the two curved cuts 18*a*, 18*b* may be disposed at opposing ends of a top slit 16, whereby the top slit 16 creates a corresponding fulcrum 7 between the tether 8 and the skirt 12. In FIG. 2B, the tether 8 includes one elongated and angled transversal cut 18*c*, the cut 18*c* being linear and angled (with respect to both horizontal and the VA) while extending from one end of the top slit 16 to one end of the bottom slit 14. The top slit 16 is circumferentially discontinuous and does not extend fully around the tethered cap 2 circumference. The bottom slit 14 is discontinuous in the area defined by the circumferential length of the transverse cut 18*c*.

The terms transversal cut is used throughout this disclosure to refer to any non-vertical and non-horizontal portions of the edge of a tether. These portions may be straight or curved. They may comprise a single angle, multiple angles, a single curvature, multiple curvatures, or combinations of angles and curvatures. FIGS. 2A and 2B illustrate exemplary transversal edges, namely the curved edges 18*a*, 18*b* in FIG. 2A and the angled edge 18*c* in FIG. 2B.

The present disclosure relates to systems and methods for manufacturing tethered plastic container caps such as those shown in FIGS. 2A-2B. In one embodiment, the container cap may include a lid portion 4 having a top wall 10 and a depending skirt 12 extending vertically downwardly from the outer circumference of the circular top wall 10 to an open bottom end 9 of the cap. An inner surface of the skirt 12 may include screw threads or other attachment means to allow the container cap to be detachably connected to a container. The skirt 12 may then be modified using systems and methods herein to produce a tethered container cap 2 as shown in FIGS. 2A-2B.

FIGS. 3A-3E illustrate a blade stack 20 and components thereof configured to manufacture a tethered bottle or container cap. In general, a blade stack 20 may comprise a stack of one or more blades and one or more spacing or support elements, or in other words, connected stacked segments. The blade stack 20 may be configured such that a container cap rotates (with respect to VA) along a circumferential edge 32 of the blade stack 20 and is cut by one or more blades extending from that surface. The arrangement of blades within the blade stack 20 may be configured so as to form a retaining ring 6 and a tether 8. At least one cut of the tether 8 formed by the blade stack 20 may be a transversal cut 18. It should be noted that although the blade stacks illustrated in FIGS. 3A-3E have a convex arc shape, a blade stack in accordance with the present disclosure may be circular, concave, or linear as well. In some embodiments, combinations of different blade stack shapes may be used.

Figure 3A:
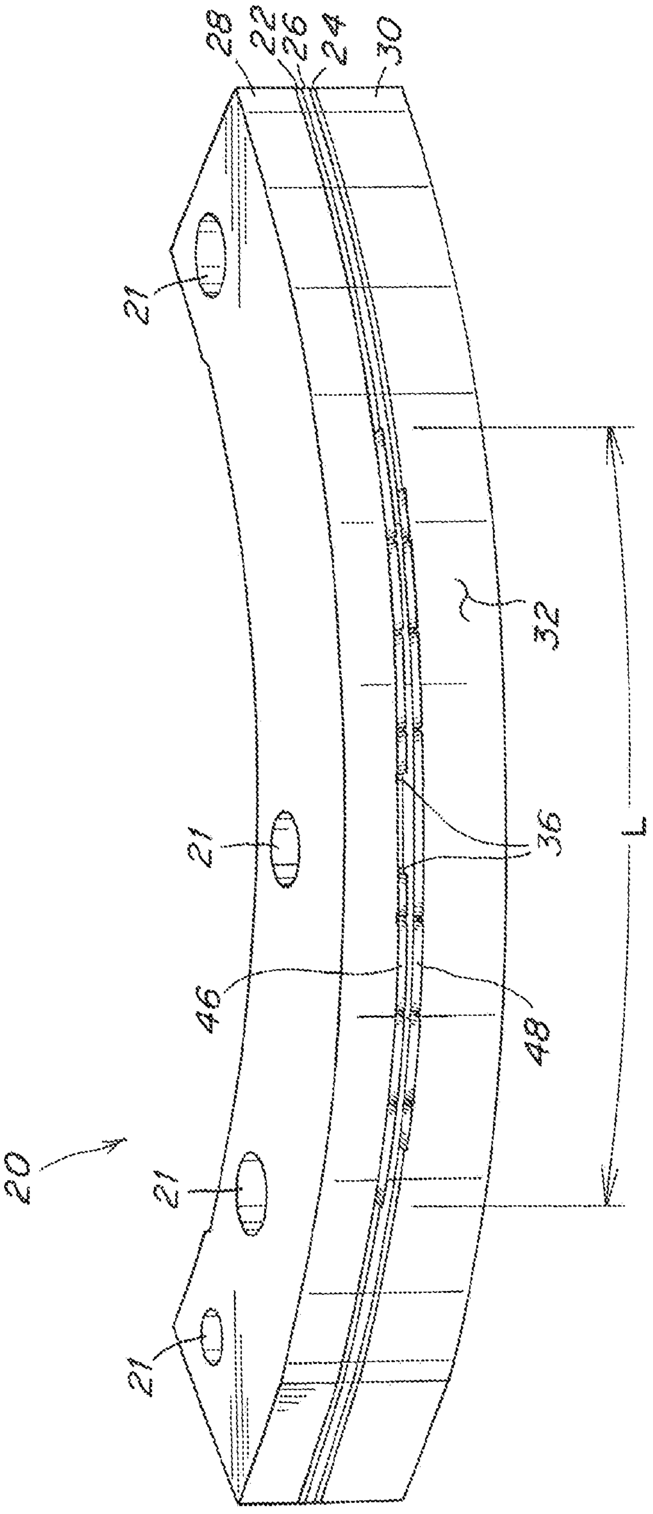
FIGS. 3A-3E are blade stacks and components thereof according to the present disclosure.
Figure 3B:
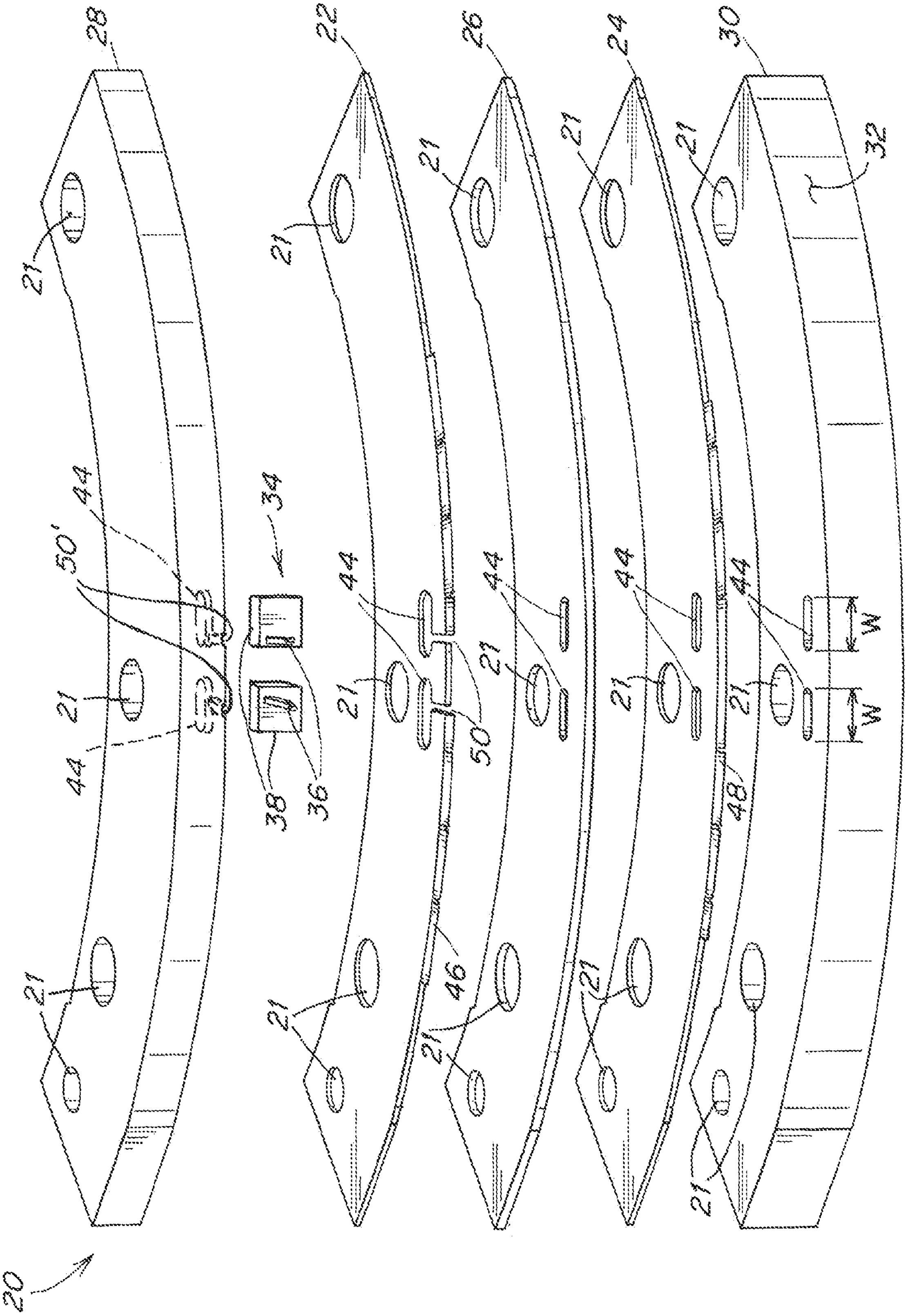

FIG. 3A illustrates an assembled view of the blade stack 20 and FIG. 3B illustrates an exploded view of the blade stack 20. The blade stack 20 may include a first blade 22 and a second blade 24. The first blade 22 may be configured to cut a bottom slit 14 of a tethered container cap 2 and the second blade 24 may be configured to cut a top slit 16 of a tethered container cap 2, as shown in FIGS. 2A-2B. The first blade 22 may include a first blade cutting portion 46 and the second blade 24 may include a second blade cutting portion 48, both of which extend from a surface 32 of the blade stack 20. The blade cutting portions 46, 48 may be sharpened. The first blade 22 and the second blade 24 may be separated from each other by a spacer 26 and may be supported and/or sandwiched by an over-blade segment 28 and an under-blade segment 30. The components of the blade stack 20 may include holes 21 formed therethrough which allow them to be aligned and joined, using screws or any other means known in the art. In the current embodiment, the closure is oriented open face up. In some embodiments, a closure may be oriented open face down in which case upper blade will form upper slit and second blade will form bottom slit.

The first blade 22 and the second blade 24 may be any type of blades known in the art. The other components of the blade stack 20 may be made of metal, plastic, or any other material known in the art. They may be configured to maintain the first blade 22 and second blade 24 in a desired position during high speed, high temperature, and/or high-volume cutting operations. The blade stack 20 may be configurable to cut a wide range of tethered container caps having different dimensions. For example, the diameter of the caps may generally range from 13 mm to 120 mm in diameter, but may also extend outside of that range.

The sharpened blade cutting portions 46, 48 of the first blade 22 and the second blade 24 may be of length L. As shown in FIGS. 3A-3B, the blade stack 20 may be arcuate (with respect to VA), and the circumferential length L may accordingly be measured along the arc of the circumferential surface 32 of the blade stack 20, from which the blade portions 46, 48 extend outwardly in a radial direction. In other embodiments, the blade stack 20 may be straight or may have any other shape known in the art. In such embodiments, the length L may be measured along a profile of a surface 32 of blade stack 20 from which the blade portions 46, 48 of the first blade 22 and the second blade 24 extend.

A height (aligned with axis VA) of the spacer 26 may determine a vertical distance between the top slit 16 and the bottom slit 14 on the tethered container cap 2 formed by the blade stack. This distance in turn may determine the height (aligned with VA) of the retaining ring 6 and of the tether 8 of the tethered container cap 2. In some embodiments, the spacer 26 may be readily interchangeable, so that spacers 26 of different heights may be used to cut tethered container caps 2 having retaining rings 6 or tethers 8 of different heights using the same first blade 22 and second blade 24. In some embodiments, the blades 22, 24 may be readily interchangeable, such that blades with differently shaped and/or sized blade portions 46, 48 may be used with the same spacer 26.

Figure 3C:
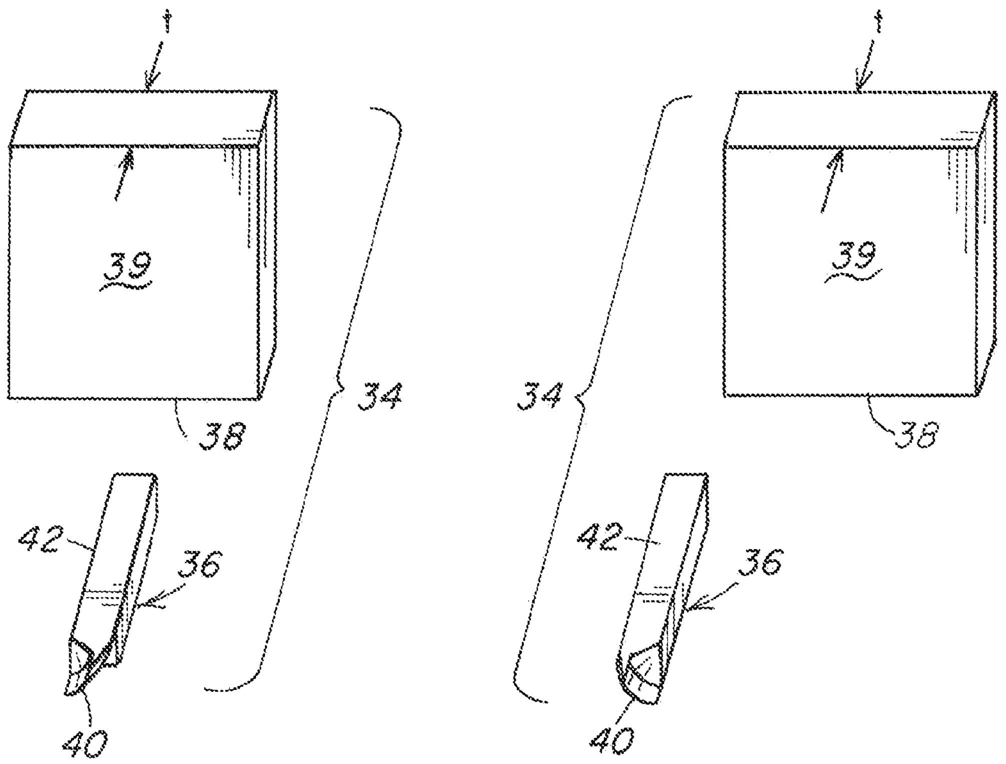

In addition to cutting the top slit 16 and the bottom slit 14, the blade stack 20 may be configured to cut one or more transversal slits 18 in a tethered container cap 2. Each transversal slit 18 may be cut by a blade insert 34, as shown in FIG. 3C. Each blade insert 34 may include a transversal blade 36 and a backrest 38. The transversal blade 36 may be configured to cut the container cap and the backrest 38 may be configured to support the transversal blade 36 as it cuts the container cap. The backrest 38 may be located disposed behind the transversal blade 36, such that when a front end of the transversal blade 36 cuts the tethered cap and is pushed backwards, the backrest 38 prevents the transversal blade 36 from moving backwards.

The transversal blade 36 may include a cutting edge 40 and a body 42. The cutting edge may be configured to cut a transversal edge as described above, and may generally have an angled, arcuate, or right-angled shape, or some combination of these shapes. The cutting edge 40 may comprise any shape known in the art. For example, as shown in FIG. 3C, the cutting edge 40 may be arcuate. Such a transversal blade 36 may be used to cut the tethered container cap 2 shown in FIG. 2A. In some embodiments, the cutting edge 40 may comprise a different curve or may comprise a straight edge formed at an angle. Such blades 36 may be used to cut the tethered container caps 2 shown in FIG. 2B.

The backrest 38 may comprise a block or other solid form of metal or other rigid material. The backrest 38 may have a generally flat side 39 configured to contact the body portion 42 of the transversal blade 36. The radial thickness t of the backrest 38 may determine how far the transversal blade 36 extends radially from the arcuate surface 32. In some embodiments, the backrest 38 may be exchangeable, such that different blade extensions may be achieved using the same transversal blade 36. In some embodiments, the backrest 38 may comprise an adjustable device having a varying thickness t. Such a backrest may allow the depth (aligned with t) of the transversal blade 36 to be varied.

The transversal blade 36 and the backrest 38 may or may not be attached to each other via adhesive and/or any other means known in the art. In some embodiments, the transversal blade 36 and the backrest 38 may be formed as a single piece. In such embodiments, the transition between the transversal blade 36 and the backrest 38 may or may not be gradual and/or include curved portions.

The other components of the blade stack 20 may be configured to accommodate the blade insert(s) 34. As shown in FIG. 3B, the first blade 22, the second blade 24, the spacer 26, the over-blade segment 28, and the under-blade segment 30 may comprise one or more cavities 44 configured to receive the backrest(s) 38 of the blade inserts 34. A width w of the cavities 44 may be such that the backrests 38 are held snugly therein, but can be readily removed. The cavities 44 formed in different components of the blade stack 20 may align with each other (along a vertical axis parallel to VA), so as to form a single, larger cavity in which a backrest 38 may be held. The cavities 44 formed in the under-blade segment 30 and the over-blade segment 28 may or may not extend fully through the segments 28, 30.

Figure 3D:
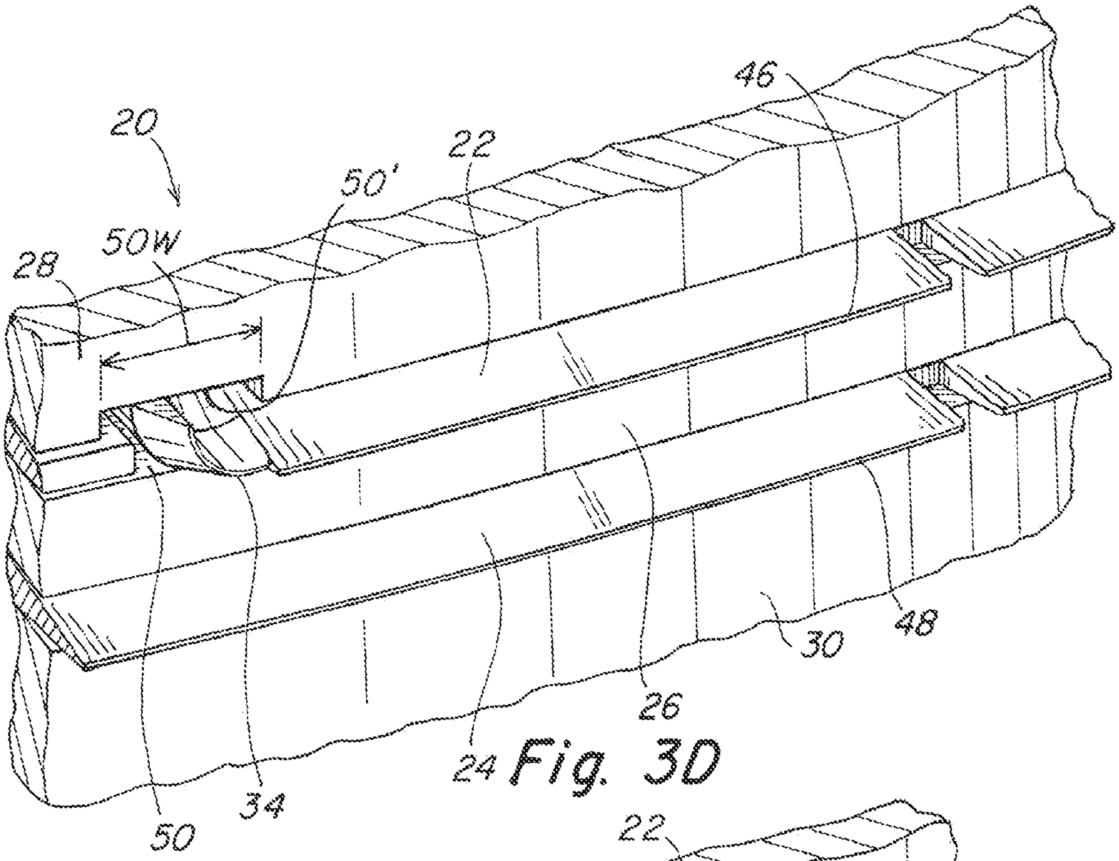

As shown in FIGS. 3B and 3D, the first blade 22 and/or the second blade 24 may include notch(es) 50 configured to accommodate the blade(s) 36 of the blade inserts 34. The notch(es) 50 may have a width 50W such that each notch 50 snugly holds the body 42 of a transversal blade 36. The notch 50 may hold the body 42 such that the cutting edge 40 extends radially from the blade stack 20 in a desired orientation. The leading edge of the cutting edge 40 may or may not be in line with the leading edge of the cutting portions 46, 48 of the first blade 22 and/or the second blade 24. In some embodiments, the spacer 26 may include notches configured to hold blade(s) 36 of the blade inserts 34.

In some embodiments, the blade stack 20 may be configured to accommodate a variety of blade inserts 34 in a variety of positions. For example, each of the components of the blade stack 20 may include multiple cavities 44 in different locations. The first blade 22 and/or the second blade 24 may include multiple notches 50 in different locations. In this way, the same blade stack 20 may be used to cut multiple types of tethered container caps 2 by merely exchanging the blade inserts 34. This may reduce the overall cost of operations. A blade insert 34 may be a transversal blade insert, or in other words, be configured to cut a transversal edge as described above. FIG. 3C illustrates exemplary transversal blade inserts 34.

Figure 3E:
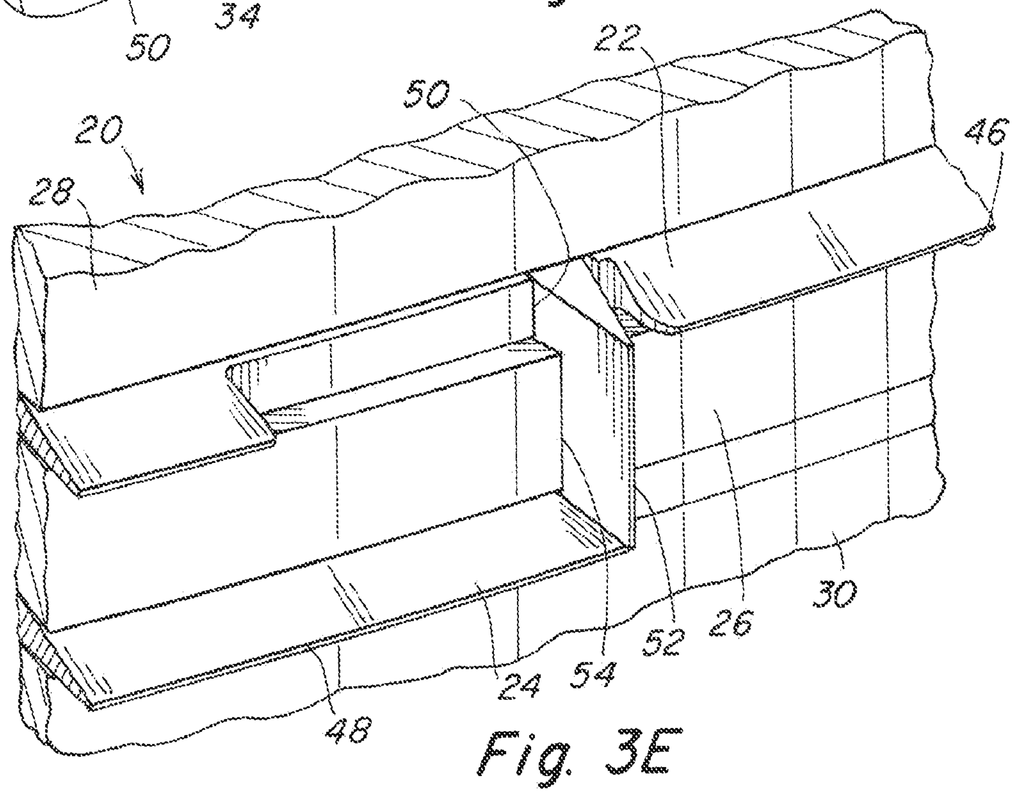

In some embodiments, as shown in FIG. 3E, the blade stack 20 may be configured to accommodate vertical blade inserts 52 (aligned with axis VA). A vertical blade insert 52 may include a vertical blade inserted into a groove 54 formed in the spacer 26. The regions of the blade portions 46, 48 of the first blade 22 and/or the second blade 24 proximate the vertical blade insert 52 may be cut away. A vertical blade insert 52 may be used in conjunction with one or more transversal blade inserts 34 or may be used alone.

A blade stack 20 as described above and illustrated in FIGS. 3A-3E may cut a container cap to form a tether 8, a retaining ring 6, and an upper lid portion 4. The tether 8 formed by the blade stack 20 may include one or more transversal cuts 18 with respect to horizontal slits 16,14. This may make the tethered container cap 2 formed by such a blade stack 20 stronger than tethered bottle caps having only right angles. Further, the blade stack 20 may include interchangeable components, which may allow for components to be exchanged for different cutting application (i.e. making different types of tethered container caps) and allow components to be easily replaced or removed for repair without necessitating replacement of the entire blade stack 20. This reduces the overall cost of using and repairing the blade stack 20 and may thereby decrease the cost of manufacturing tethered container caps.

Figure 4A:
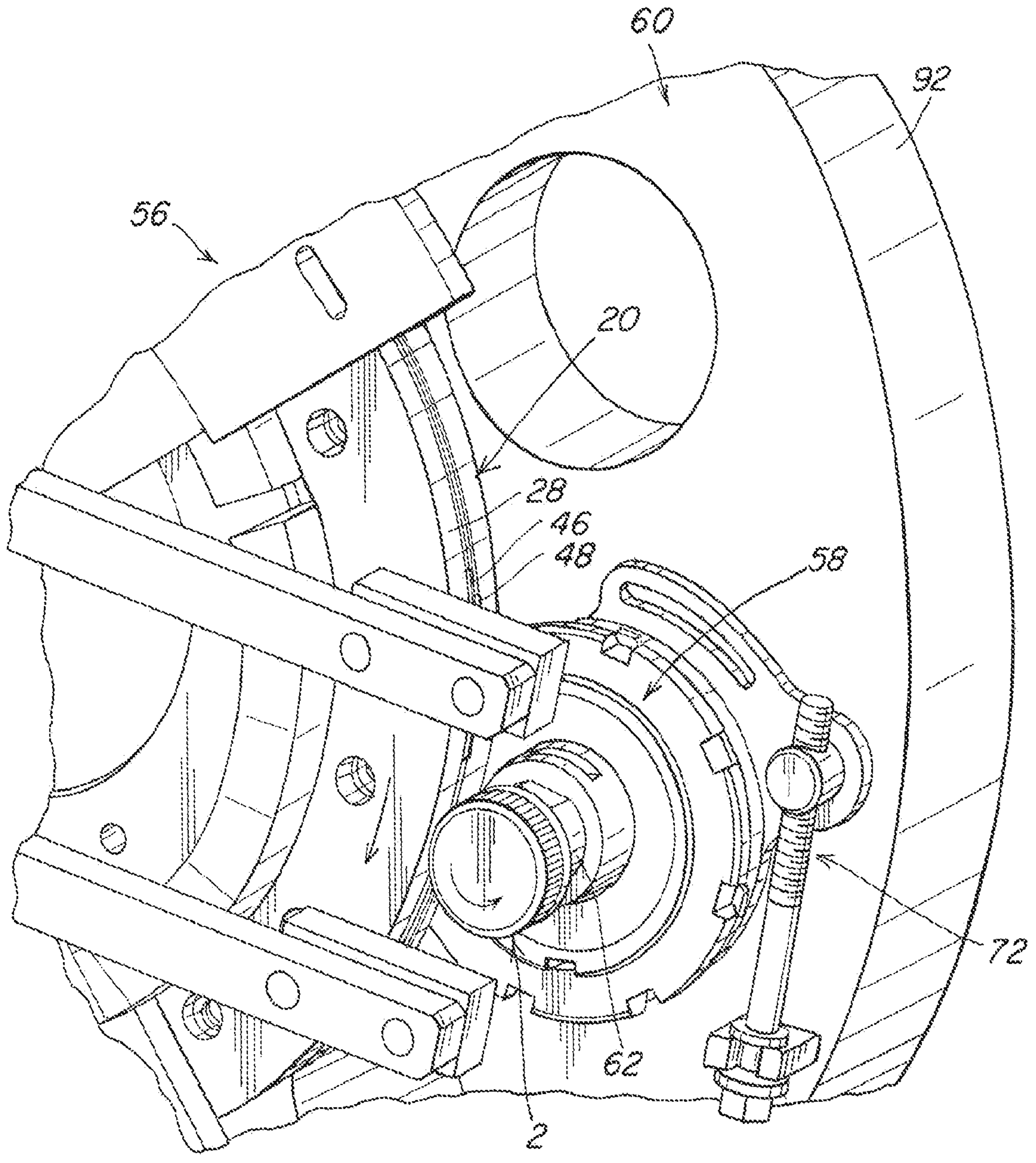
FIGS. 4A-4D are tethered cap manufacturing systems according to the present disclosure.
Figure 4B:
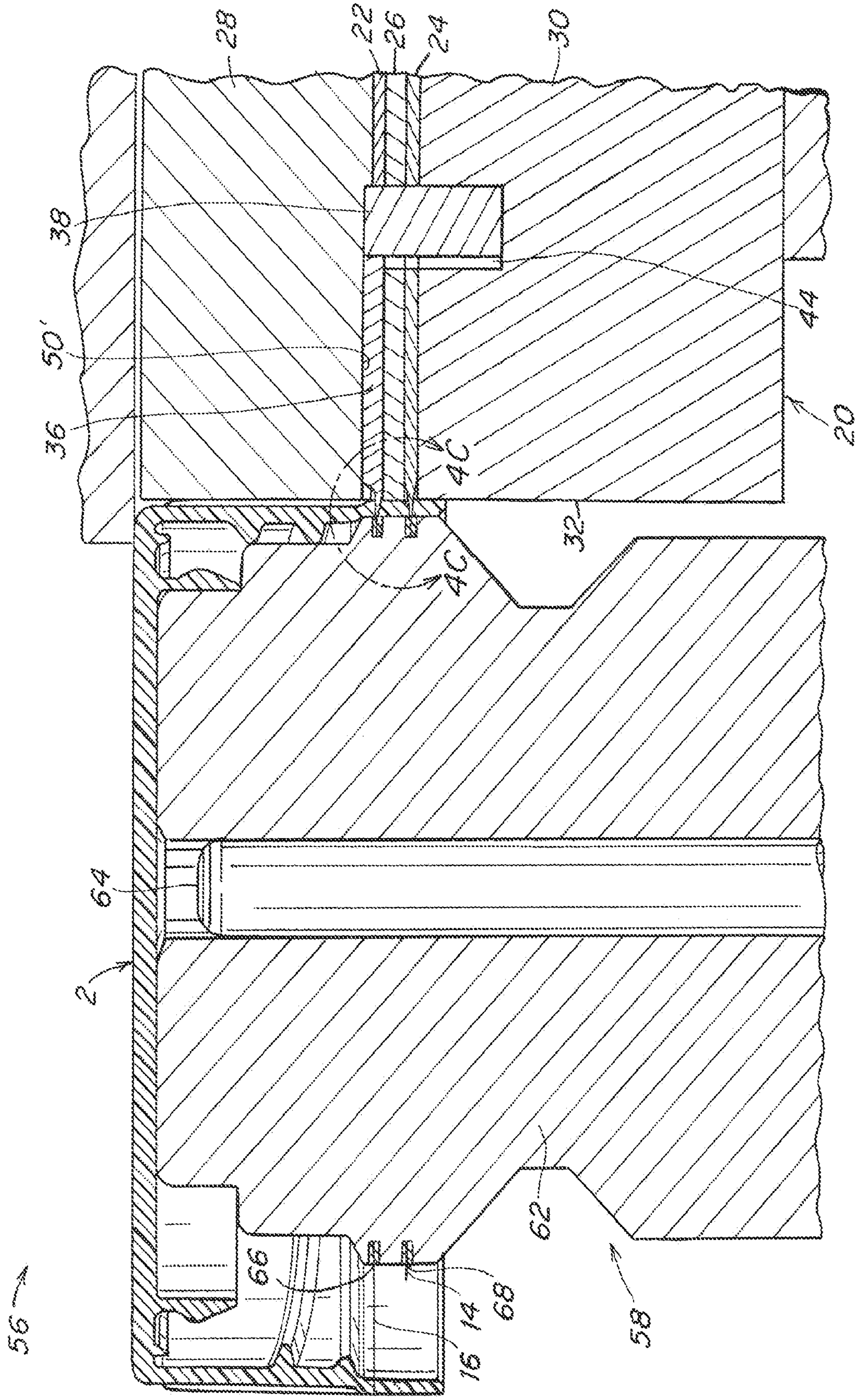
Figure 4C:
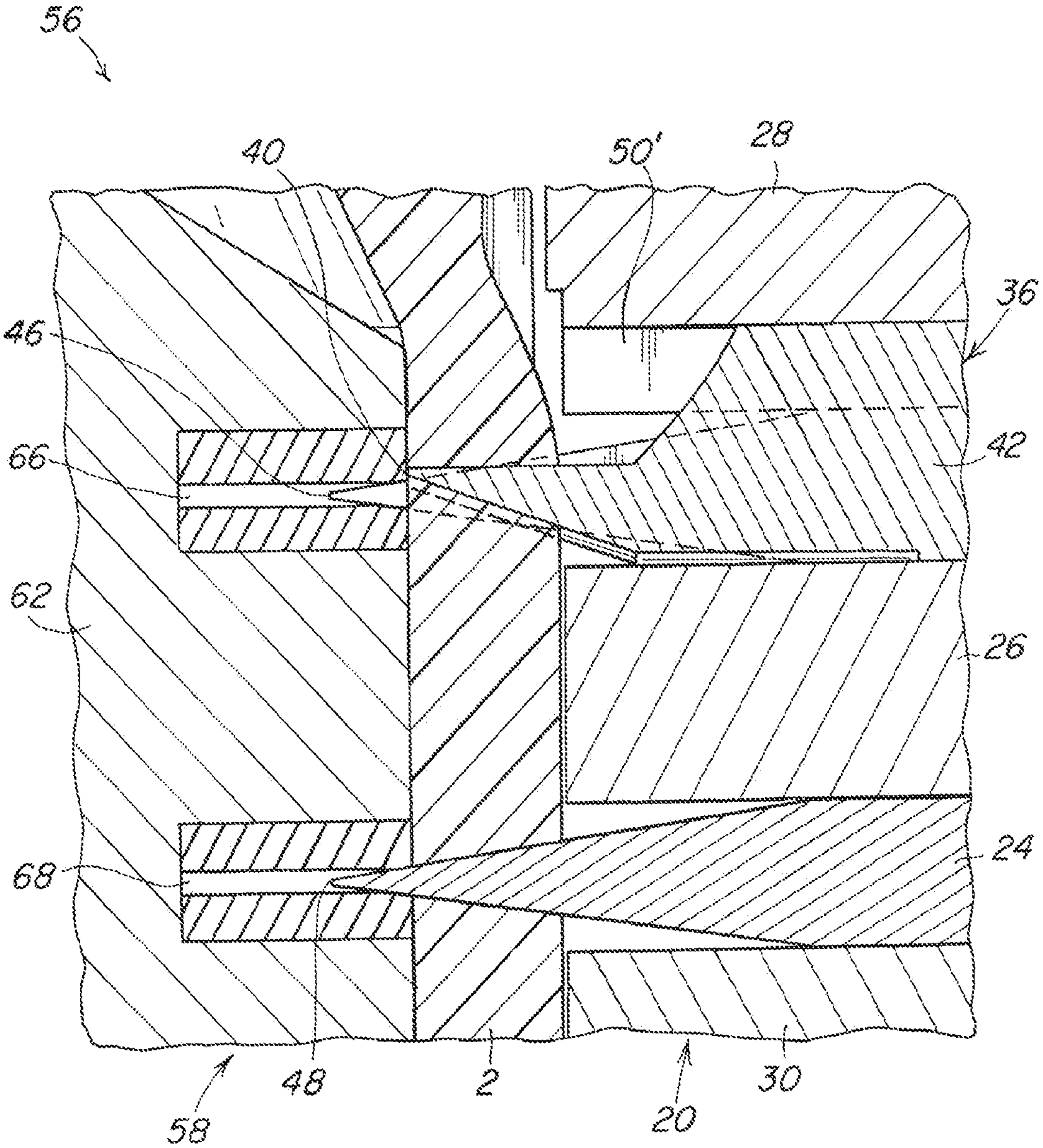

Systems in which the blade stack 20 may be used to manufacture tethered container caps 2 are described below. FIGS. 4A-4C illustrate cap manufacturing systems 56 including blade stacks 20.

Figure 4D:
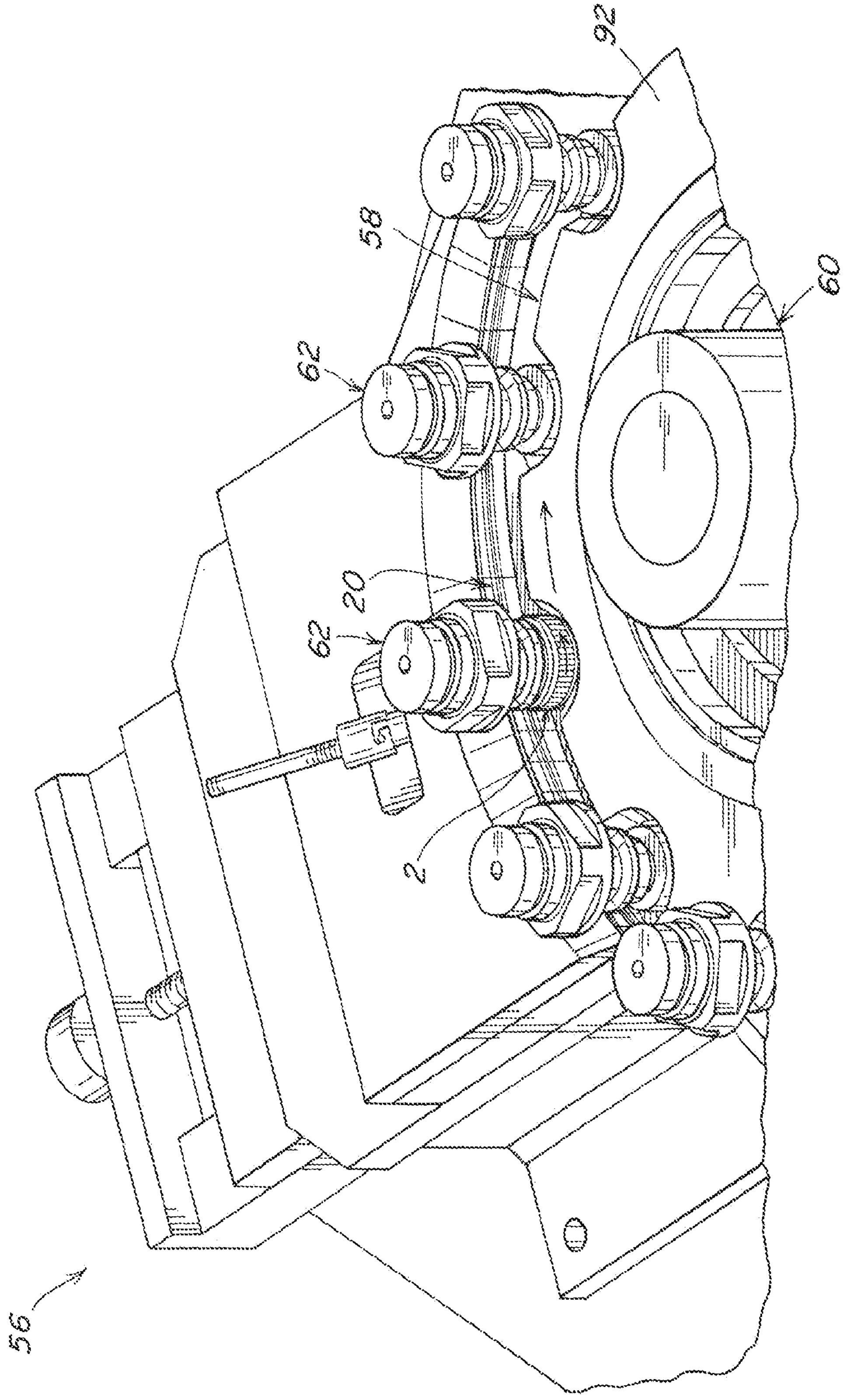

FIG. 4A illustrates a cap manufacturing system 56 configured to manufacture a tethered container cap 2 as shown in FIGS. 2A-2B. The cap manufacturing system 56 may include a blade stack 20, a cap holding assembly 58, and a rotation assembly 60. The cap holding assembly 58 may hold a container cap as it is cut by the blade stack 20 to form a tethered container cap 2. The rotation assembly 60 may rotate (with respect to a vertical axis aligned with VA) the blade stack 20 and the cap holding assembly 58 relative to each other, either by rotating the blade stack 20, the cap holding assembly 58, or both. It should be noted that FIG. 4A illustrates a vertical slitter configuration. The present disclosure may be implemented with either a vertical or a horizontal slitter configuration. FIG. 4D illustrates an exemplary horizontal slitter configuration, in which like parts are labelled with like reference numbers. If the slitter configuration is horizontal, as shown in FIG. 4D, the blade stack 20 may be concave, and the cap holding assembly 58 may be located on an interior side of the blade stack 20.

The cap holding assembly 58 may hold the container cap such that it may be cut by the blade stack 20, as the blade stack 20 and the cap holding assembly 58 rotate relative to each other. The cap holding assembly 58 may include an internal tool 62 on which the container cap is disposed. The container cap may fit loosely around the internal tool 62, such that the container cap may be easily released from the internal tool 62 after it is cut. In some embodiments, the internal tool 62 may have groves that match the position and profile of the blade stack 20 so that the blades can penetrate and cut through completely the skirt 12 of the container cap. In some embodiments, there may not be grooves in the internal tool 62 matching all or part of the blade stack 20, such that the blade(s) does not completely cut through the skirt 12. For example, the upper and lower blades 22, 24 may have a matched groove in the internal tool 62, but the transversal blades 34 may not. Whether or not the plastic cap skirt 12 will be completely cut or not will affect the “break force” or detachability of the closure from the container. In some embodiments, the cap holding assembly 58 may include other elements configured to hold the container cap on the internal tool 62.

In some embodiments, the tether 8 and all the slit 16, 14 or cut 18 features formed by the blade stack 20 may be formed such that they are aligned with other features of the tethered container cap 2, such as closure features, threads, or easy-opening features. The internal tool 62 may be threaded, such that the internal threads of the cap skirt engage with threads of the internal tool 62. The threads may be aligned with features of the cap, and in this way, threading the cap onto the internal tool may allow the tether 8 to be cut in the cap such that it aligns with the other features of the cap. In some embodiments, a keyed feature or other element may be used to perform the alignment instead of or in addition to threads.

In some embodiments, the cap holding assembly 58 may lift the container cap before it is cut and release it after it is cut. For example, the internal tool 62 may extend and retract in a direction normal to the plane in which the blade stack 20 rotates. In other embodiments, the container cap may be otherwise moved onto and off of the internal tool 62. The blade stack 20 may be fixed on a frame or may rotate with the cap. The internal tool 62 may be fixed or retractable. The internal tool 62 may extend to engage with a container cap which has not yet been cut and it may retract to disengage from the tethered container cap 2 which has been cut by the blade stack 20. In some embodiments, the extension and retraction may be performed via a central ejector rod 64, as shown in FIG. 4B. The ejector rod 64 may stabilize the cap when it is placed on or removed from the internal tool 62.

In some embodiments, the cap holding assembly 58 may be positionable. For example, as shown in FIG. 4A, the cap holding assembly 58 may include a bolt mechanism 72 which may allow it to be bolted in different positions such that the radial distance from the center (aligned with axis VA) of the internal tool 62 from the blade stack 20 may be adjusted. This may allow it to be used with different blade stacks 20 or used to cut different types of tethered container caps 2.

FIGS. 4B-4C illustrate cross-section views of the cap holding assembly 58, a tethered container cap 2, and the blade stack 20 during a cutting operation. FIG. 4C provides a close-up view of the elements shown in FIG. 4B. The internal tool 62 of the cap holding assembly 58 may be disposed within the skirt 12 of the tethered container cap 2. As shown in FIG. 4B, the internal tool 62 may include external features which engage with internal features of the tethered container cap 2. An outer diameter of the internal tool 62 may be smaller than an inner diameter of the tethered container cap 2, such that the tethered container cap 2 moves relative to the internal tool, such that a portion of the skirt 12 of the cap is sandwiched between the blade stack 20 and the internal tool 62.

The internal tool 62 may also include features which accommodate the blades of the blade stack 20. These features may include a top groove 66 and a bottom groove 68 configured to accommodate the first blade 22 and the second blade 24, respectively. The grooves 66, 68 may allow the blades 22, 24 to pass all the way through the cap, thereby making the top slit 16 and the bottom slit 14 cut-through slits.

In some embodiments, the internal tool 62 may also include features which accommodate the transversal blade insert(s) 34. Such features may include grooves, notches, or other features made by removing material from the internal tool 62. In some embodiments, as shown in FIG. 4C, the internal tool 62 may not include such features. In such embodiments, the transversal blade insert 34 may not extend as far as the first blade 22 and the second blade 24, but rather may extend only through the cap 2. The transversal cut formed by the transversal blade insert 34 in such embodiments may be a partial cut which only extends partially through the thickness of the material of the tethered container cap 2, such that a film of remaining uncut cap material covers the slit. The transversal blade insert 34 may abut the internal tool 62 during cutting or there may be a small gap between the transversal blade insert 34 and the internal tool 62. The gap may prevent the blade insert 34 from becoming worn. In some embodiments, the thickness of the backrest 38, as shown in FIG. 3C, may determine the width of the gap and/or allow the transversal blade insert 34 to extend into a feature formed on the internal tool 62. Accordingly, exchanging the backrest 38 for a differently sized backrest 38 may allow the transversal slit to be cut differently. Any of the top slit 16, bottom slit 14, and transversal cut(s) 18 made in the tethered container cap 2 may be cut-through the entire thickness, or only partially through the entire thickness without departing from the scope of the disclosure.

The rotation assembly 60 may rotate the cap holding assembly 62 relative to the blade stack 20 about a vertical rotation axis, aligned with axis VA. The blade stack 20 may be rotated while the cap holding assembly 62 is held stationary or the cap holding assembly 62 may be rotated while the blade stack 20 is held stationary. In some embodiments, both the cap holding assembly 62 and the blade stack 20 may be mobile.

The manufacturing system 56 may cut up to approximately 4000 caps per minute. In some embodiments, the manufacturing system 56 may cut caps at an even greater rate. The manufacturing system 56 may operate at up to approximately 325 rotations per minute. The manufacturing system 56 may be oriented vertically and include a convex blade stack as shown in FIG. 4A, or may be oriented horizontally and include a concave blade stack or comprise a combination of these configurations.

In some embodiments, the cap holding assembly 58 may rotate about the blade stack 20 (about a vertical rotation axis, aligned with axis VA). As shown in FIG. 4A, the cap holding assembly 58 may be attached to a wheel 92, which may rotate around a stationary blade stack 20. In some embodiments, the cap holding assembly 58 may be stationary and the blade stack 20 may rotate. As shown in FIG. 4A, the blade stack may rotate interior to the cap holding assembly 58.

As discussed above, FIGS. 3A, 3B and 4A, 4D illustrate an arcuate blade stack 20, but other blade stack configurations are included within the scope of the present disclosure. If a linear or radial blade stack or a blade stack with a different shape is used, the rotation assembly 60 may be modified as necessary to rotate the cap holding assembly 58 relative to that blade stack 20. One skilled in the art would readily understand how to make such modifications based on the present disclosure.

The cap manufacturing system 56 shown in FIGS. 4A-4C may be used to manufacture tethered container caps 2 as shown in FIGS. 2A-2B. These container caps may have advantages over other tethered container caps as they may be more resilient. The system 56 may be capable of operating at high speeds to produce large volumes of tethered container caps. It may also include interchangeable and/or adjustable parts, such that it may be used to make a variety of types of tethered container caps 2 and parts may readily be repaired or replaced.

Figure 5:
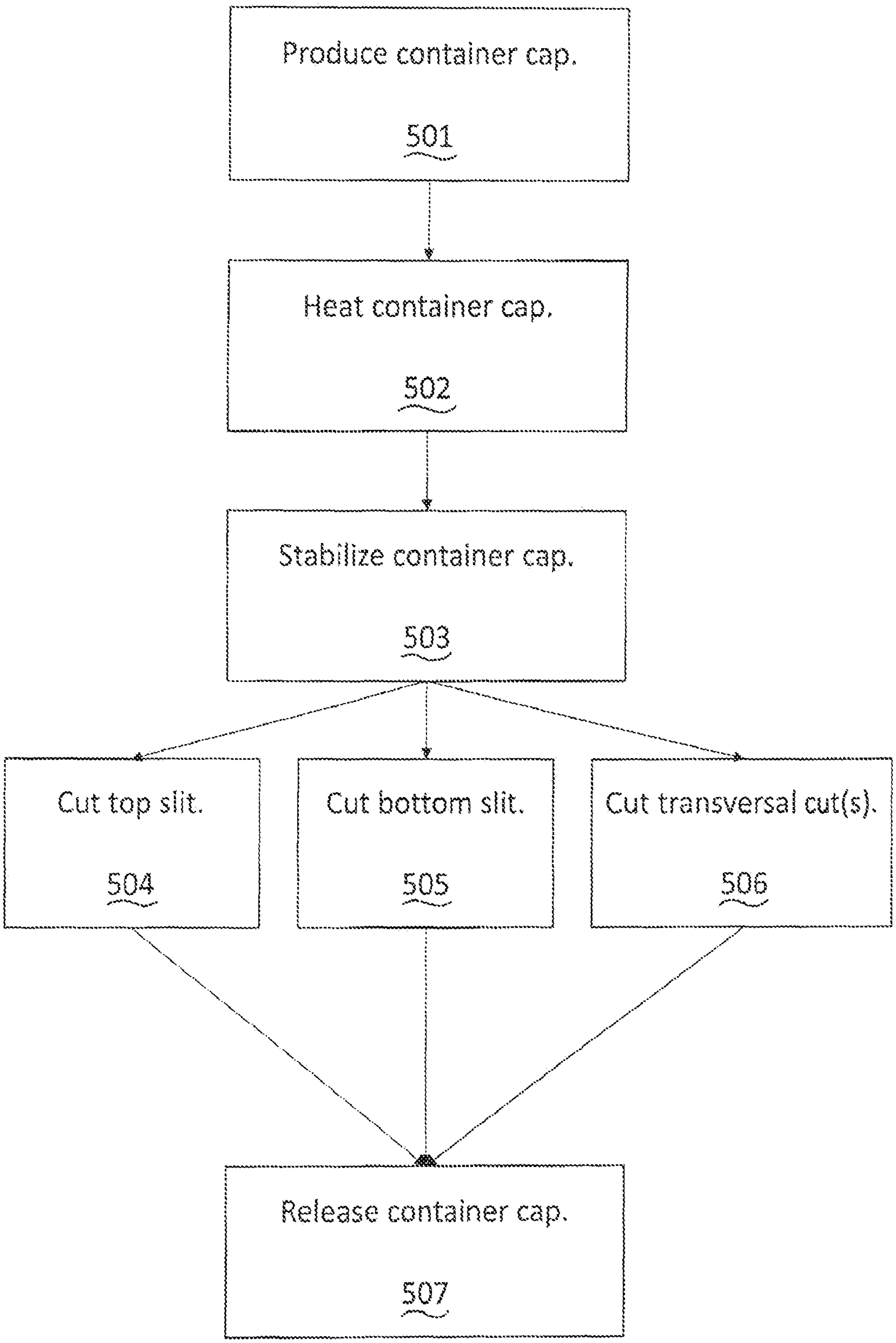
FIG. 5 is a flowchart outlining a method of manufacturing a tethered container cap in accordance with the present disclosure.

The present disclosure also relates to methods of manufacturing tethered container caps. These methods may or may not use the systems described and illustrated above. FIG. 5 shows a flowchart outlining one method of manufacture.

A container cap may be produced using any means known in the art (501). In some jurisdictions (e.g., the European Union), tethers are or will soon be mandatory on all single use containers under 1 liter or under 3 liters. Accordingly, the container cap may be a standard bottle cap for a single use drink container. The cap may include an upper portion and a skirt, which may have threads or other attachment elements formed on an inner side for engagement with a container. Production of the container cap may be performed at the same facility as the following steps or at a different facility. If it is performed at the same facility, the production may or may not be integrated into a single process with the following steps.

The container cap may optionally be heated (502). Heating the container cap may soften the material of the cap and make it easier to cut the cap without breaking the material. The container cap may be heated through any means known in the art. In some embodiments, the cap may travel along a heated conveyor belt. In some embodiments, the equipment used to heat the cap may be heated. The temperature to which the container cap is heated may range from 25° C. to 100° C. in some embodiments.

The container cap may optionally be disposed on a cap holding assembly or otherwise stabilized (503). The cap holding assembly may hold the cap such that the skirt of the cap may be cut to have a retaining ring and a tether. In some embodiments, the cap holding assembly may be similar to what is illustrated in FIGS. 4A-4C. In some embodiments, the cap may be held by means other than a cap holding assembly.

A top slit (504), a bottom slit (505), and one or more transversal cuts (506) may be cut in the cap simultaneously or nearly simultaneously. For example, all of the slits and cuts may be cut by rotating the cap along a blade stack as described above. The blade stack may cut all of the slits and cuts in the container cap. In some embodiments, the slits 16, 14 and/or cuts 18 may be made by other means. The blades used to cut the slits and cuts may be heated during this step. In some embodiments, one or more of the slits or cuts may be laser cut.

The steps described above may produce a tethered container cap 2 as illustrated in FIGS. 2A-2B. The tethered container cap 2 may be disengaged from the cap holding assembly or otherwise released (507). The cap may then be attached to a container, such that a retaining ring of the cap remains attached to the container when the cap is opened, and the tether connects the cap to the retaining ring.

The present disclosure also relates to methods of manufacturing systems for manufacturing tethered container caps. In particular, the disclosure deals with methods of manufacturing transversal blade inserts and the blade stacks in which they are used. The blade inserts may be very fine and small, and they may be manufactured from a symmetrical blank.

Figure 6A:
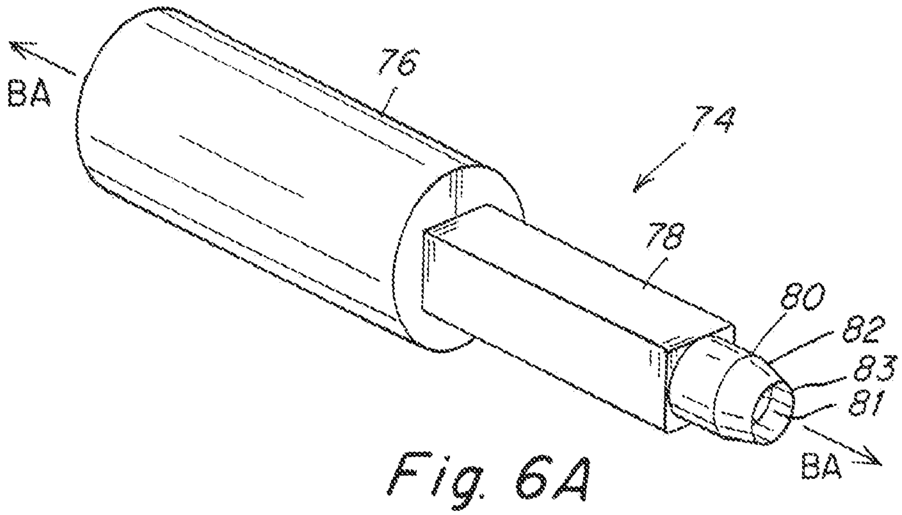
FIGS. 6A-6C are manufacturing steps for a transversal blade insert in accordance with the present disclosure.
Figure 6B:
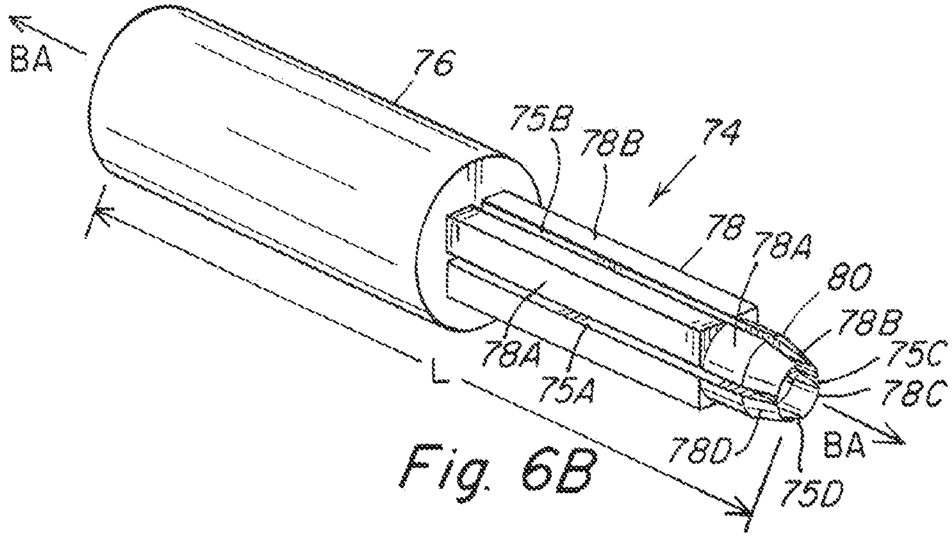
Figure 6C:
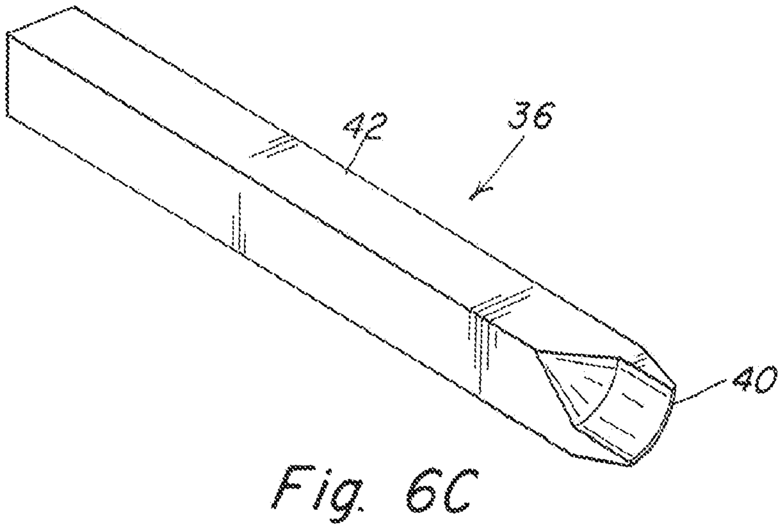

FIGS. 6A-6C illustrate one embodiment of the steps of manufacturing a transversal blade 36 for a transversal blade insert 34. As shown in FIG. 6A, a blank 74 may include a support 76 at a first end, a body 78 between the opposing first and second ends, and a hollow blade portion 80 at the second end. The blade portion may be considered a hollow blade portion 80 because it comprises a central hole 81 surrounded by an extended wall 82. The hollow blade portion 80 may comprise a hollow circular, oval, or polygonal extension with a sharpened edge. The sharpened edge 83 at the end of the hollow blade portion 80 may form a blade at the end of the extended wall 82. The sharpened edge may be formed in the same plane or with varying edge depths. In some embodiments, the hollow blade portion 80 may comprise an irregular or non-symmetrical shape. The hollow extension may be shaped such that when it is cut, it yields two or more blade segments 80, 80. The resultant blade segments may have the same shape as each other, for example if they are cut from a radially symmetric blade portion. The resultant blade segments may have different shapes than each other: for example, one blade segment may be shaped to produce a cut similar to that shown as 18*a* in FIG. 2A and another blade segment may be shaped to produce a cut similar to that shown as 18*c* in FIG. 2B. The blank 74 may be made using a CNC lathe or any other machine tools known in the art. The circular extension shown in FIG. 6A may be relatively easy to make using a lathe. Each blank 74 may be used to make four transversal blades 36.

As shown in FIG. 6B, the blank 74 may be cut (via longitudinal cuts 75A, 75B, 75C, 75D) into four pieces along a portion of its length L (aligned with axis BA). Each of the four pieces (78A, 78B, 78C, 78D) may include a portion of the support 76, a portion of the body 78, and a portion of the blade portion 80. In some embodiments, the blade portion of each piece may comprise a quarter circle. The cutting may be performed using wire electrical discharge machining (EDM) or any means known in the art. Wire EDM may allow the cuts to remove a minimal amount of material, and thereby not significantly reduce the coverage of the blade portion.

The support 76 may be removed from each of the pieces to a transversal blade 36 for a transversal blade insert 34, as shown in FIG. 6C. Each blade may comprise a transversal cutting edge 40 (80 in FIG. 6B) and a body 42 (82 in FIG. 6B). In another example, a square shaped blade extension may be cut into four equal parts and may yield straight blade segments. The transversal blade 36 may be used in conjunction with a backrest 38 to form a transversal blade insert 34. The backrest 38 may comprise a polygonal piece of metal or other material manufactured through any means known in the art. The blade inserts 34 may be disposed in a blade stack as described above. In some embodiments, a straight blade insert 34 may be inserted into a blade stack at an angle to produce an angled cut or slit and thus produce a tether with a higher yield strength than traditional tethers. The components of the blade stack may be manufactured using any means known in the art. One skilled in the art will be familiar with methods of manufacturing blades, spacers, and other components of the blade stack. The blade stack may also be manufactured to have cavities, grooves, and/or other features to accommodate the blade inserts 34.

Methods and systems of the present disclosure may make it possible to manufacture tethered container caps having tethers with transversal cuts 18, or in other words, non-vertical and non-horizontal cuts, which may be less likely to break than traditional tethers because they require greater force to break or tear. The present disclosure may further make the manufacture of tethered container caps easy and inexpensive. Methods and systems disclosed herein may use interchangeable parts so that a wide variety of tethered cap shapes can be cut using the same blade stacks and other components. In general, this may make these systems and methods more reliable and repeatable than prior art systems and methods.

Tests confirm that adding a "curved cut" (such as 18*a*) at the end of the horizontal slits (16, 14) significantly improves the pull force required to actually break the tethers and detach the closure from the bottle neck. In more quantifiable terms, on a given closure, the following comparison was found:

| Tethered slit design | Average pull force required to break the tether |
|---|---|
| "Traditional" two horizontal double slits | 24N |
| Two horizontal double slits with upper curved cut on each end of the upper horizontal slit (see FIG. 2A) | 27N |
| Two horizontal double slits with curved cut on each end of both upper horizontal and lower horizontal slit | 34N+ |

The benefit of this over prior art is that, in most cases, one can modify the slit design of an existing closure such that it meets the new tethered caps sustainability regulations, without having to re-design the cap or to elongate the skirt.

The invention claimed is:

1. A system for making tethered container caps, the system comprising: a cap holding assembly configured to hold a cylindrical container cap comprising a horizontal top lid having a circular perimeter, a cylindrical skirt extending vertically downwardly from the circular perimeter of the top lid, and a cylindrical retaining ring disposed at a lower end of the skirt opposite the lid, the cap holding assembly comprising: an internal tool configured to be disposed within and hold the cylindrical skirt of the container cap; a blade stack comprising connected stacked segments which include: first and second blades each having a horizontal cutting edge configured to cut first and second horizontal slits respectively in the skirt to form a tether of the cap, the tether being disposed between the first and second horizontal slits and connecting the retaining ring to an upper portion of the skirt, each of the first and second blades further includes at least one inside cavity configured to receive a back rest of a blade insert, the blade insert comprising said back rest and a transversal blade, said transversal blade having a transversal cutting edge configured to cut a transversal cut in the container cap adjoining at least one of the horizontal slits, the transversal cutting edge being disposed at an acute angle to the horizontal cutting edge forming the adjoining horizontal slit, and the horizontal cutting edge forms the adjoining horizontal slit having at least one notch connecting at least one of said cavity to an outside of the blade stack and configured to receive the transversal blade, said transversal blade receiving support from said back rest and said stack when in said notch; and the system further comprises a rotation assembly configured to move the cap holding assembly relative to the blade stack, such that the first, second and transversal blades of the blade stack cut the container cap to form the first and second horizontal slits and the transversal cut that form the tether and retaining ring of a tethered container cap, wherein the blade stack further comprises a blade spacer disposed between the first blade and the second blade, the blade spacer including a spacer cavity configured to hold the back rest.

2. The system of claim 1, wherein the transversal cutting edge comprises a curved blade or an angled blade.

3. The system of claim 1, wherein the blade stack comprises an over-blade segment and an under-blade segment, configured to sandwich the first blade and the second blade.

4. The system of claim 1, wherein the blade stack is arcuate, and the horizontal cutting edge of the first blade, the horizontal cutting edge of the second blade and the transversal cutting edge extend along an outer or inner arcuate surface of the blade stack.

5. The system of claim 1, wherein the internal tool comprises one or more internal tool grooves configured to receive the first blade and the second blade of the blade stack and/or wherein the internal tool is configured to allow the tether to be cut in alignment with one or more additional elements of the tethered container cap.

6. The system of claim 1, wherein the cap holding assembly is configured to rotate about the blade stack or wherein blade stack is configured to rotate relative to the cap holding assembly.

7. The system of claim 1, wherein the back rest and the transversal blade of the blade insert are separate parts.

8. A method of manufacturing a tethered container cap, the method comprising: providing a cap holding assembly configured to hold a cylindrical container cap, the cap comprising a horizontal top lid having a circular perimeter, a cylindrical skirt extending vertically downwardly from the circular perimeter of the top lid, and a cylindrical retaining ring disposed as a lower end of the skirt opposite the lid, the cap holding assembly comprising an internal tool, a blade stack and a rotation assembly, the blade stack comprising connected stacked segments which include:

first and second blades each having a horizontal cutting edge configured to cut first and second horizontal slits respectively in the skirt to form a tether of the cap, a blade spacer disposed between the first blade and the second blade, the tether being disposed between the first and second horizontal slits and connecting the retaining ring to the skirt, and each of the blade spacer and the first and second blades further including at least one inside cavity configured to receive a back rest of a blade insert, the blade insert comprising said back rest and a transversal blade, said transversal blade having a transversal cutting edge configured to cut a transversal cut in the container cap adjoining at least one of the horizontal slits, the transversal cutting edge being disposed at an acute angle to the horizontal cutting edge forming the adjoining horizontal slit, the horizontal cutting edge forming the adjoining horizontal slit having at least one notch connecting at least one of said at least one inside cavity to an outside of the blade stack and configured to receive the transversal blade, said transversal blade receiving support from said back rest and said stack when in said notch; and the rotation assembly being configured to rotate the cap holding assembly relative to the blade stack, the method comprising steps of: disposing the internal tool within the cylindrical skirt of the container cap to hold the cap within the blade stack; rotating, via the rotation assembly, the cap holding assembly relative to the blade stack, such that the horizontal cutting edge of the first blade, the horizontal cutting edge of the second blade and the transversal cutting edge of the blade stack cut the container cap to form the first and second horizontal slits and the transversal cut that form the tether and retaining ring of a tethered container cap.

9. The method of claim 8, comprising cutting the first slit and the second slit simultaneously.

10. The method of claim 8, further comprising heating the cylindrical container cap and/or heating one or all or a combination of the blades of the blade stack.

11. The method of claim 8, wherein cutting at least one transversal cut comprises cutting the cylindrical skirt with the transversal blade.

12. The method of claim 8, wherein the back rest and the transversal blade of the blade insert are separate parts.

* * * * *